July 31, 1928.  
H. B. LINDSAY  
BODY FORMED OF SEPARATE FIBERS  
Filed Jan. 22, 1925  
1,679,251  
5 Sheets-Sheet 1
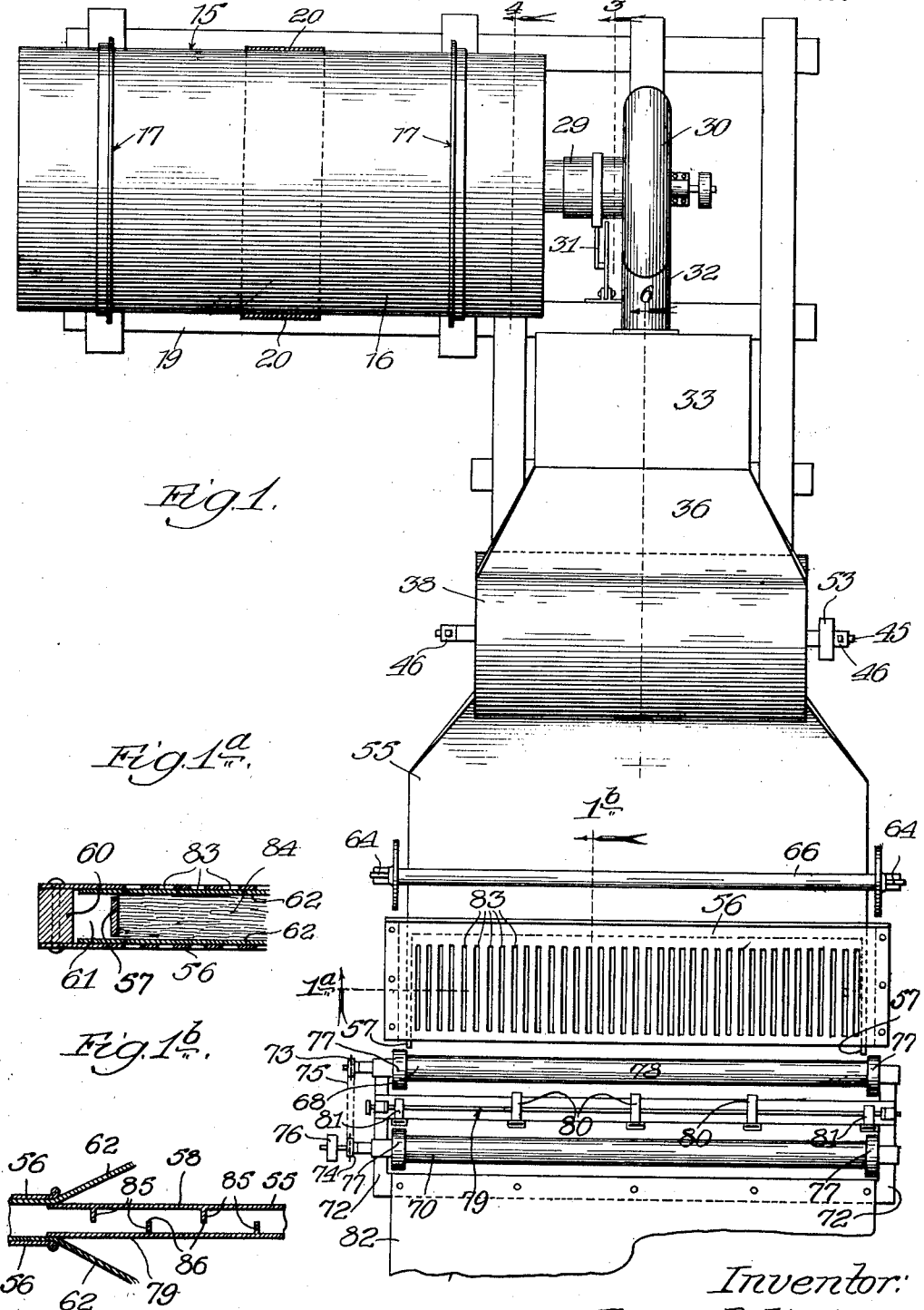

July 31, 1928.
H. B. LINDSAY
1,679,251
BODY FORMED OF SEPARATE FIBERS
Filed Jan. 22, 1925
5 Sheets-Sheet 2
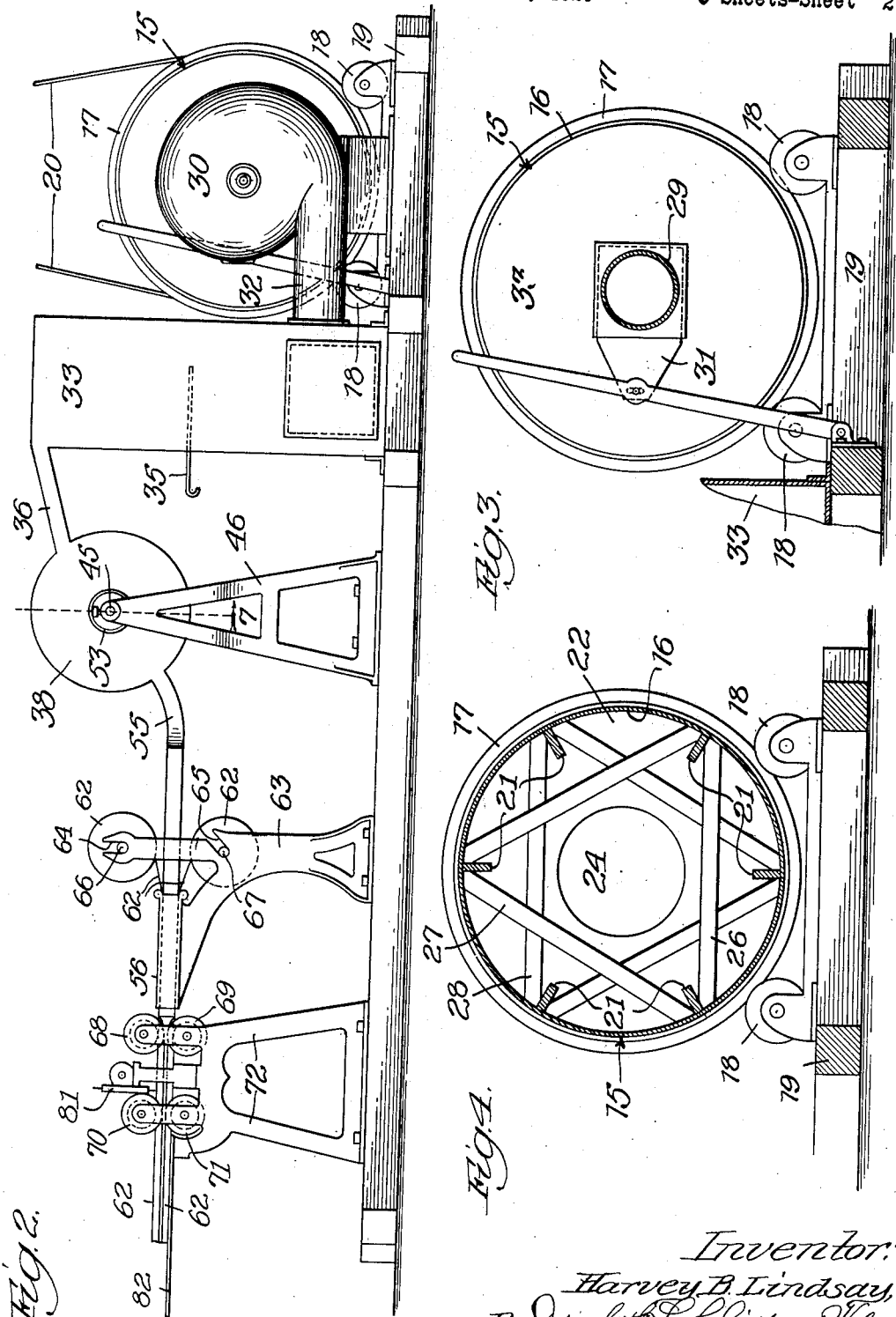
Inventor:
Harvey B. Lindsay,
By Dyrenforth, Lee, Chritton & Wiles,
Attys.

July 31, 1928.
H. B. LINDSAY
1,679,251
BODY FORMED OF SEPARATE FIBERS
Filed Jan. 22, 1925
5 Sheets-Sheet 3
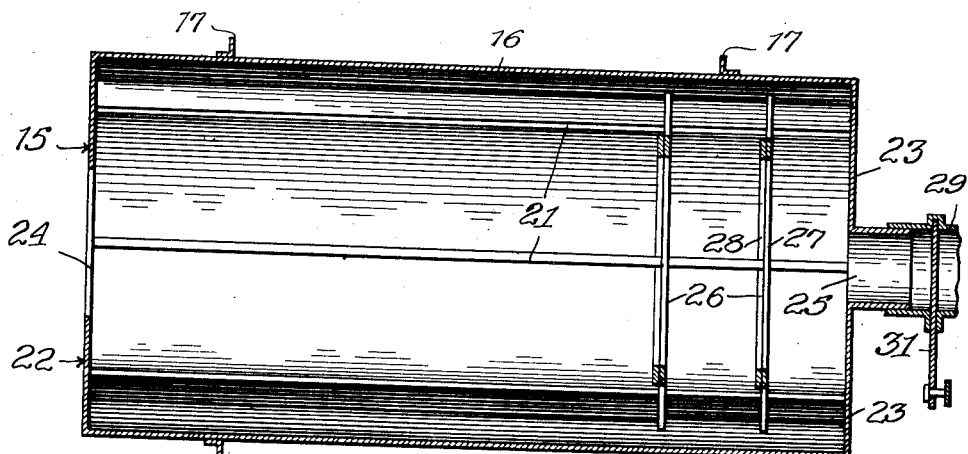
Fig. 5.
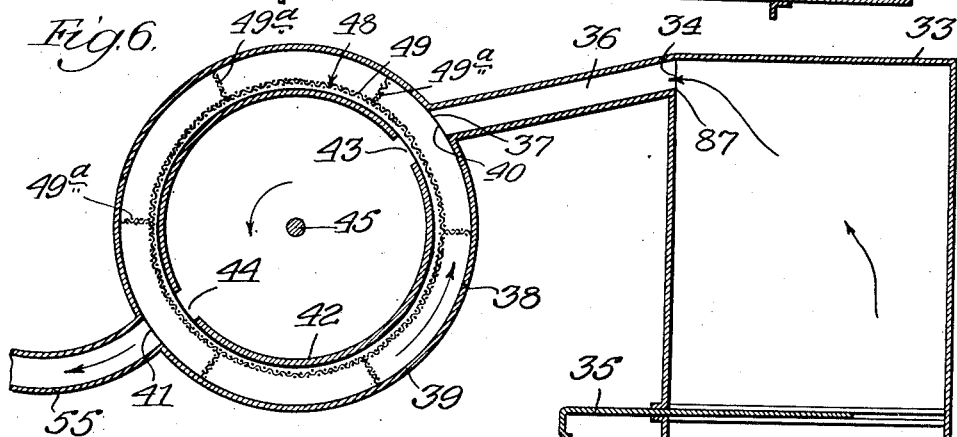
Fig. 6.
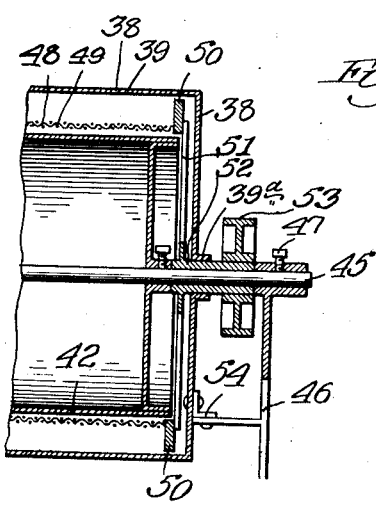
Fig. 7.
Inventor:
Harvey B. Lindsay July 31, 1928.  
H. B. LINDSAY  
1,679,251  
BODY FORMED OF SEPARATE FIBERS  
Filed Jan. 22, 1925   5 Sheets-Sheet 4
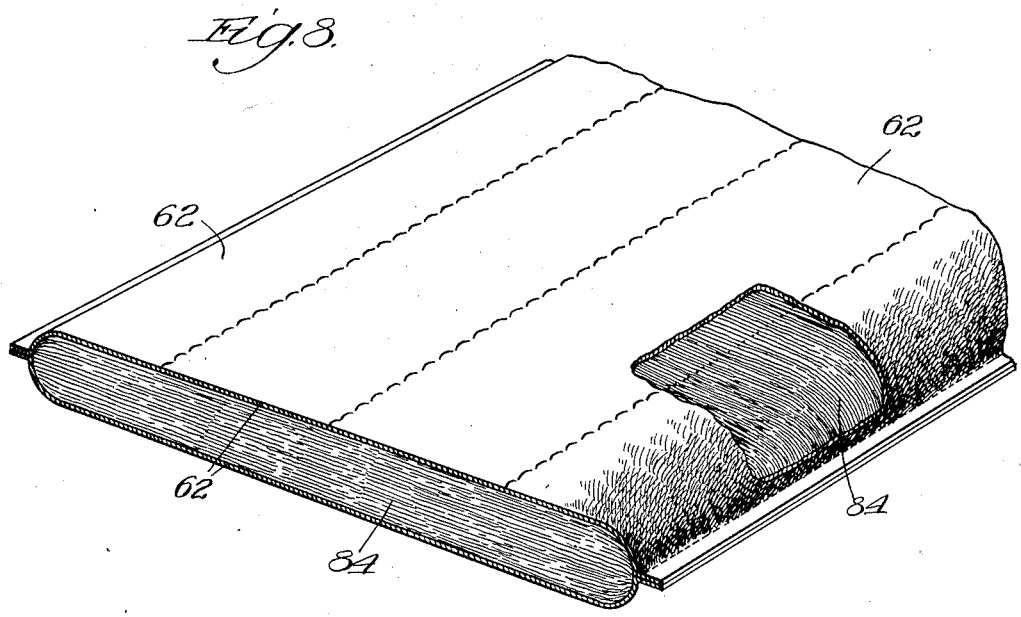

July 31, 1928.
H. B. LINDSAY
1,679,251
BODY FORMED OF SEPARATE FIBERS
Filed Jan. 22, 1925
5 Sheets-Sheet 5
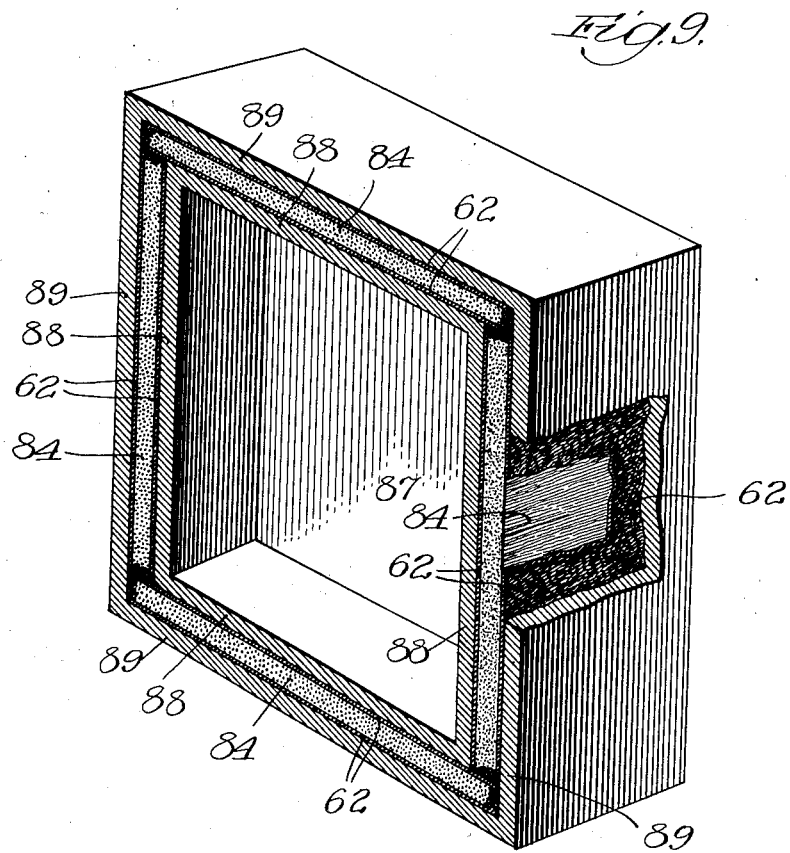
Inventor:
Harvey B Lindsay
By Dyrenforth, Lee, Chritton and Wiles,
Att'ys Patented July 31, 1928.

1,679,251

UNITED STATES PATENT OFFICE.

HARVEY B. LINDSAY, OF OAKLAND, CALIFORNIA, ASSIGNOR TO DRY ZERO CORPORATION, OF WILMINGTON, DELAWARE, A CORPORATION OF DELAWARE.

BODY FORMED OF SEPARATE FIBERS.

Application filed January 22, 1925. Serial No. 4,018.

My invention relates to bodies formed of separate fibers, such as, and more particularly what is generally known in the trade as, kapok fibers, which are of tubular form, and especially to thermal insulating bodies and as to another aspect thereof to cushioning bodies, or structures, such as bedding mattresses, carpet cushions and upholstery, the filling of which is formed of separate fibers.

As a preface to the following description, it should be stated that I have discovered that the more nearly at right angles to or across the line of heat transmission the fibers of the body of insulating material are laid and the nearer the approach to a condition in which the fibers are spaced from each other a microscopic distance, the greater the efficiency of a given thickness of insulating body, and this is particularly true of a body composed of fibers the surface of which present a high degree of smoothness as for example, in the case of kapok.

According to my demonstrated theory of thermal insulation, transmission of heat through a body composed of separate fibers is principally governed by the degrees of microscopic smoothness of those surfaces of the fibers which extend transversely of the path of heat transmission and the proximity of the surfaces of the fibers to each other but with minimum contact. This is due to the action which takes place in such a body wherein the external surfaces of the fibers, as also the internal surfaces thereof when of tubular form, are subject to the bombardment of the rapidly moving gaseous atoms where the insulating material is subjected to heat traversing the air to which the fibers are exposed. These gaseous atoms being heated their external electrons are under violent agitation and transmit, through such agitation, violent agitation to the external electrons of the molecules of the fibers proportional to the length of time they are in contact with the latter, and the converse is true where the fibers are in heated condition, in which case the external electrons of the molecules of the fibers are in violent agitation and transmit such agitation to the electrons of the gaseous atoms proportional to the length of time the electrons of the molecules of the fibers so violently agitated are in contact with the electrons of the gaseous atoms.

Where the surfaces of the fibers are relatively rough and therefore present microscopic crevices, depressions or projections, the gaseous atoms bound and rebound against the surfaces of such irregularities before escaping, and with each impingement the agitated electrons of the hotter element re-act on the relatively quiescent electrons of the cooler element, conveying their excess agitation to the latter and thereby transmitting heat. Thus, the smoother the surfaces of the fibers the less the rebounding of the moving electrons and consequently the less transmission of heat. It is, therefore, desirable to employ smooth-surfaced fibers, and, in order that the maximum resistance to travel of the heat throughout the mass be effected, to so position the fibers that they will lie as nearly parallel to each other and transverse to the line of heat transmission as possible and yet present the minimum of points of actual contact with each other, the ideal arrangement being that in which the fibers are out of contact and are spaced apart a microscopic distance and lie transverse to the line of heat transmission. Furthermore, it is desirable that the fibers be as free as possible of kinks or fractures, as such tend to reduce the resilience and life of the insulating body composed of the fibers.

Furthermore, in cushioning bodies, or structures, the filling of which is composed of separate fibers, such as, for example, bedding mattresses, carpet cushions and upholstery, the disposition of the fibers relative to each other determine the lasting quality of the structure, the greater the amount of interlocking or interlacing of the fibers, when bent at sharp angles, the shorter the life of the cushioning structure. This is due to the fact that in the alternate compression and release of the fibers, in the use of the structure, the fibers, being sharply bent at their interlocked or interlaced points, will inevitably break at those points thus reducing the body to a mass of short shattered pieces no longer having the resilience of the whole tube or fiber. Whereas, when disposed as above described the breaking of the fiber is almost entirely eliminated as the alternate compression and release of the cushioning structure in use does not bend the fibers back and forth at a sharp angle.

My object generally stated is to provide a body formed of separate fibers, in which at least the greater portion of the fibers extend in the same general direction, to the end that the body, when formed of thermal insulating fiber as for example kapok, will present a higher degree of resistance to heat transmission therethrough than in the case of insulating bodies as hitherto provided, and presenting the same density, viz, the same number of pounds per cubic foot, thereby economizing in the amount of fiber used and reducing the thickness of body required; and when formed of fibers suitable for cushioning purposes, as for example kapok, the resilience of the body or structure formed of the fibers will be greatly prolonged.

Referring to the accompanying drawings:

Figure 1 is a plan view, with certain portions omitted, of an apparatus suitable for producing my improved fiber body. Figure 1ª is a broken, enlarged sectional view of a detail of the apparatus, the section being taken at the line 1ª on Fig. 1 and viewed in the direction of the arrow. Figure 1ᵇ is a similar view of the detail of the apparatus, the section being taken at the line 1ᵇ on Fig. 1 and viewed in the direction of the arrow. Figure 2 is a view in side elevation of the apparatus shown in the preceding figures. Figure 3 is a section taken at the line 3 on Fig. 1 and viewed in the direction of the arrow. Figure 4 is a section taken at the line 4 on Fig. 1 and viewed in the direction of the arrow. Figure 5 is a plan sectional view of the tumbler device forming a part of the apparatus. Figure 6 is a section taken at the line 6 on Fig. 1 and viewed in the direction of the arrow. Figure 7 is a broken section taken at the line 7 on Fig. 2 and viewed in the direction of the arrow. Figure 8 is a broken, perspective view of my improved body or structure; and Figure 9, a sectional, perspective view of a chamber insulated in accordance with my invention.

Referring to the particular illustrated apparatus it comprises a device, represented generally at 15, for subjecting the bale of fiber from which the body is to be formed, to such an action that the fibers thereof will be loosened from each other at the outer surface of the bale for movement to the part of the apparatus in which the body to be produced is formed and without tearing or breaking the fibers. The device 15 which operates by a tumbling action comprises a tumbler drum 16 shown as of cylindrical form mounted at circular, circumferentially disposed tracks 17 thereon, on rollers 18 journaled in spaced relation on a supporting frame 19, the drum 16 being driven in any suitable manner, as for example through the medium of a belt 20 driven from any suitable source.

The drum is provided about its inner surface with a plurality of baffle forming ribs 21 which extend lengthwise of the drum in preferably substantially equidistantly spaced relation, as shown (Fig. 4). The ends 22 and 23 of the drum contain centrally-disposed openings 24 and 25, respectively, the opening 24, in the particular arrangement shown communicating with the atmosphere, serving to permit of flow of air into the drum through this end thereof under the action of suction applied to the opening 25, as hereinafter described, and producing air currents in the drum which entrain the separated fibers and conduct them out of the drum. The drum is preferably several times as long as a bale of the material to be operated upon and contains at its outlet end open-work barriers represented generally at 26 spaced-apart lengthwise of the drum, each of these barriers being shown as formed of two generally triangular portions 27 and 28 arranged relative to each other as shown in Fig. 4, these barriers serving to prevent the bale or heavy mass of the fibers from moving in the drum to a position in which they interfere with the desired freedom of movement of the air, and the fibers entrained therein, through the outlet 25. The outlet 25 communicates, through the medium of a revolving joint conduit 29, with the inlet of a suction blower represented at 30 which may be of any desirable construction, as by way of example of the centrifugal type, the conduit 29 being provided with a valve 31 for regulating the flow of air currents therethrough. The outlet of the blower 30 and shown generally at 32 communicates with the inlet of a chamber 33 the outlet of which, in its opposite wall, is represented at 34. The chamber 33 which is provided primarily for the purpose of settling out from the fiber conducted into it such heavy formed particles as may be contained therein as well as any masses of interlocked or intertwisted fibers, is provided with a sliding plate-valve 35 which regulates the flow of air and fibers through the casing 33. The outlet 34 which is shown as substantially of the same width as the casing 33 opens into an outwardly flaring conduit 36 the expanded outlet of which, and represented at 37, opens into a measuring device represented generally at 38. The measuring device 38 which is provided for the purpose of ensuring substantially uniform flow of the fiber to the former-device, hereinafter described, comprises a cylindrical housing 39 containing openings 40 and 41 in its circumferential side-wall which extend substantially the full length of the latter and form an inlet and an outlet, respectively, for the housing, the inlet 40 communicating with the conduit 36. By preference there is located within the housing 39 and concentrically disposed relative to the latter and in spaced relation thereto, an inner shell 42 provided with an inlet and an outlet 43 and 44, respectively, which extend substantially the full length of the shell and in registration with the inlet and outlet 40 and 41, respectively, of the housing 39. The housing 39 and shell 42 are supported at their ends on a shaft 45 fixed in the upper ends of stationary brackets one of which is represented at 46, the ends of the shell 42 being secured to the shaft 46 as by set screws, as shown by the set screws 47 in Fig. 7. The measuring device also comprises a rotatable interstitial drum structure represented generally at 48 and located within the annular space between the shell 42 and the housing 39, the device 48 comprising a cylindrical side-wall-forming portion 49 of interstitial form, it being preferably formed of wire mesh. The ends of the drum 48 comprise rings 50 connected, and extending concentrically, with the cylindrical portion 49 of the drum 48, these rings projecting radially outwardly beyond the portion 49 and being connected with the outer ends of spokes 51 connected with hub portions 52 rotatably mounted on the ends of the shaft 45 between the end walls of the shell 42 and the end walls of the housing 39. One of the hub portions 52 is shown as provided with a pulley 53 driven from any suitable source, and through the medium of which the drum structure 48 is rotated in the direction of the arrow in Fig. 6. The hubs 52 extend between the shaft 45 and openings 39ª in the ends of the housing 39 as shown of one end of the structure in Fig. 7, and means, represented at 54, are provided for rigidly connecting the housing 39 to the brackets 46. The drum structure 48 also comprises a plurality of radially-disposed parallel fins 49ª provided in a series about the circumference of the side-wall portion 49 and extending within the space defined by the side walls of the housing 39 and drum-portion 49 and the rings 50, these fins which extend parallel with the axis of the drum portion 49 and are preferably equidistantly spaced apart and extend from one ring 50 to the other thereof and close to the inner circumference of the side wall of the housing 39, being preferably of interstitial form, preferably of wire mesh construction.

It will be noted from the foregoing that power applied to the pulley 53 causes the interstitial drum structure 48 to be rotated thereby causing the several compartments provided about the circumference of the drum device 48 to be moved in succession across the paths traversed by the air currents entering shell 42 from the conduit 36 and leaving the shell 42 at its outlet 44; and that the volume of fiber (carried by said air currents) which will be discharged from this device, can be governed by the speed of rotation of the drum.

The outlet 41 of the measuring device communicates with the inlet end of a conduit 55 the outlet end of this conduit 55 which forms a nozzle, extending loosely into the former device, represented at 56 and hereinbefore referred to. The outlet portion of the nozzle 55 is of general rectangular shape in cross section with its side walls, represented at 57, preferably extending entirely through the former 56 which is likewise of rectangular shape in cross section. The upper and lower walls 58 and 59, respectively, of the nozzle reach short of the outer ends of the walls 57 and terminate a short distance beyond the extreme forward edge of the former 56, as shown in Fig 1ᵇ. In other words, the upper and lower walls of the former 56 overlap the corresponding walls of the nozzle and extend in spaced relation thereto as shown on said figure. The inside cross sectional dimensions of the former 56 are greater than the outside cross sectional dimensions of the nozzle 55, the walls of which latter extend, throughout the portions thereof which extend into the former, out of contact with the latter as clearly shown in Figs. 1ª and 1ᵇ, the spaces thus provided between the end walls 57 of the nozzle and the end walls of the former, and represented at 60, being indicated at 57.

Associated with the former device 56 are means for supporting rolls 62 of covering material, as for example, and preferably cloth fabric, to be positioned at opposite sides of the fiber body produced in the former 56, these means comprising standards 63 on which the former 56 is mounted, located at opposite sides of the apparatus and containing notches 64 and 65 in which the ends of the cores 66 and 67 carrying the sheet material 62 are seated for rotation, these notches being disposed, respectively, above and below the plane occupied by the former 56.

The sheet material 62, which, in the particular arrangement shown, is of a width considerably greater than the width of the outlet end of the nozzle 55, extends from the rolls thereof into the former 56 at the upper and lower portions of the latter and into the spaces between the upper and lower walls of the former and the corresponding walls of the nozzle, as shown. (Fig. 1ᵇ.)

Located beyond the former 56 are feeding means comprising two sets of feed rolls represented at 68, 69, 70 and 71, journaled at their ends in frame works 72 at opposite sides of the apparatus, these sets of rolls being spaced apart lengthwise of the apparatus and the rolls of each set thereof being respectively disposed above and below the formed body and the upper and lower envelope material. The upper rolls, as shown, are drive rolls having drive connection therebetween as by means of sprockets 73 and 74 on the rolls and a sprocket chain 75 engaging these sprockets, driving power being applied to one of the upper rolls, as through the medium of a belt pulley 76 on the roll 70.

The rolls 68, 69, 70 and 71, are alike as to form and size, each preferably presenting at its ends, laterally beyond the side walls 57 of the nozzle 55, circular disklike portions 77 which are so spaced apart as to firmly grip between them the lateral edges of the sheet material 62 which extend laterally beyond the side walls 57 of the nozzle. The portions of the rolls intermediate the disk-like portions 77, and indicated at 78, are of such reduced diameter that they are spaced apart a distance sufficiently less than the thickness of the body produced in the former 56, and comprising the mass of fibers and the superposed and underlying sheet material 62, to provide tractive effect; the positioning of the disk-like portions 77 on the rollers 68 and 69, as stated, causing the lateral edges of the sheet material 62 to be drawn together into flatwise engagement, at opposite sides of the formed body as represented at one side in Fig. 2, the sheet material 62 thereby encasing the mass of fibers throughout the upper, lower, and side surfaces thereof.

Means are provided in the apparatus shown for stitching through the body formed of the mass of fibers and the covering material 62 and also for sewing together the lateral edges of the covering material 62, these means being represented generally at 79 and comprising a plurality of stitchers represented at 80 which may be of any suitable construction, such as are commonly used in the manufacture of stitched pads of various kinds and sewing devices located in line with the disk-like portions 77 at opposite sides of the apparatus and represented at 81, these devices being of any desirable construction for sewing together in flatwise condition, the lateral edges of the sheet material 62.

A description of the operation of the illustrated apparatus in so far as it has been above described, is as follows:

Assuming a bale of fiber is introduced into the tumbler device 15, the operation of the suction blower 30 draws the fibers, separated from the bale by the tumbler action, out of the drum 16 and thence into the blower from which they are discharged through the outlet 32 into the settling chamber 33 wherein any solid foreign particles or relatively heavy masses of interlocked or intertwisted fibers, are caused to gravitate to the bottom of this casing. The fibers pass out of the casing 33 through the outlet 34 and thence through the conduit 36 into the compartments presented about the periphery of the interstitial drum 48 in which compartments the fibers become deposited. By the rotation of the drum 48 the fibers in these compartments, when the latter in the rotation of the drum move to a position in which they register with the outlet 44 of the inner shell 42, are blown, by the air-blast entering the shell 42 through the inlet 43, out of these compartments and into the nozzle 55 and thence into the former device 56 wherein the fibers become massed into a body within the space defined by the side walls 57 of the nozzle and the sheet material 62 as shown in Fig. 1ª. It may be here stated that in the initial starting of the apparatus a barrier would be placed across the rear end of the device 56 adjacent the extremities of the walls 57 of the nozzle against which the fibers first blown into the former device would impinge, in order that a body of the fiber may be built up. Thereafter the feed mechanism and the stitching and sewing mechanism hereinbefore referred to, will be set into operation to feed the body composed of the mass of fibers and the sheet material 62 to carry out of the former-device and upon a table represented at 82 the assembled mass of fibers and sheet material and stitch, or tuft the same to the condition shown in Fig. 8, the operation of producing the body or structure being thereby rendered continuous.

As it is necessary that the air carrying the fibers into the former 56 be relieved from the former 56 after depositing the fibers therein, vents are provided in the former device formed preferably in both the top and bottom walls of the former device, the vent openings in the top wall thereof being represented at 83, it being understood that the air escapes through the sheet material 62 and thence through the openings 83.

The fibers, in their course of travel into the former device 56, are caused to be so acted upon as to cause the greater proportion thereof, and preferably practically all thereof, to become disposed normal to the path of the air currents flowing through the apparatus, to the end that the fibers as they become massed in the former device 56, as above stated, will extend in the same direction, and approach substantial parallelism, as represented of the mass of fibers represented at 84 and constituting the body thereof which is encased within the covering material 62, whereby the body composed of the separate fibers is caused to present what might be termed a grained condition, as distinguished from a fiber body in which the fibers extend in every direction and presenting a chaotic condition.

The laying of the fibers in the grained condition referred to is effected by subjecting the fibers in their travel to the former device, to a cylindrical eddying action which not only causes the fibers to become disposed normal to the path of the air currents through the apparatus, but also tends to disengage from each other fibers which may be interlocked or intertwined. The cylindrical eddying action referred to may be effected by interposing in the path of the air currents a relatively sharp edge portion disposed normal to the air-currents and operating to deflect the air currents as stated and cause the fibers to become disposed substantially parallel to such eddying edge portion. I have found in practice that the best results are produced by providing a plurality of these edge portions extending into the conduit from opposite sides thereof and in staggered relation whereby successive eddying actions are produced in the travel of the air currents to the former device. The apparatus shown is provided with means of the character above referred to, these means being shown as located in the nozzle 55 closely adjacent the former device 56, and comprising fins 85 extending substantially at right angles to the upper and lower walls of the nozzle and throughout the width of the latter, these fins which are of approximately the height of one-half the vertical cross-sectional dimension of the nozzle 55, being shown as equidistantly spaced and alternating with each other and preferably presenting relatively sharp cornered, substantially straight, edges 86.

Any relatively sharp edge portion extending into the course of the air currents flowing through the apparatus operate, to a greater or less degree, to produce the positioning of the fibers in the air currents, and parallel to such edge-portion, as stated, and such action is effected to a noticeable degree by the inner edge portion of the valve 35, whereby the fibers are caused to become deposited in the compartments provided about the periphery of the drum 48 in a condition approaching parallelism.

Where the product of the apparatus is to be used for thermal insulation it is desirable that the mass produced comprise for each cubic foot thereof approximately one pound of the fibers and accordingly the speed at which the various mechanisms described are driven should be regulated.

By the use of the measuring device described a uniform flow of fibers to the former device 56 producing a uniformly dense mass of the fibers in the latter may be effected for any width or size of the body to be produced, the volume of fibers delivered to the nozzle being governed by the speed at which the drum of the measuring device is rotated.

In the use of the body of separate fibers for thermal insulating purposes, the body would be so disposed, as for example in the hollow wall, that the fibers extend substantially normal to the direction of heat transmission therethrough to the space to be insulated; and in the use of the body as a cushioning structure, the body would be so positioned that the fibers extend substantially normal to the pressure to be cushioned by the body.

In Figure 9 I have shown, in section, a chamber to be insulated and provided with insulating material in accordance with my invention. In this drawing the chamber indicated at 87 is formed of inner and outer walls 88 and 89, respectively, spaced apart with bodies of the insulating material shown in Fig. 8 located in these spaces as shown, whereby the fibers 84 of the bodies extend in a direction crosswise of the direction of heat transmission through the walls of the chamber.

Kapok fibers in their natural condition, are sealed at their opposite ends, against access of moisture to the interiors thereof, rendering them waterproof to a very high degree. It is very desirable that in the treatment of the fibers, they be maintained in uncrushed and unbroken condition, partly for the reason that it is desired that they be rendered as nearly waterproof as possible, the subjection of the fibers to the treatment described resulting in the minimum crushing or breaking of the fibers.

While I have illustrated and described my improved body or structure as produced by a certain apparatus and method, I do not wish to be understood as intending to limit my invention thereto.

What I claim as new, and desire to secure by Letters Patent, is:

1. A body of thermal insulating material comprising kapok fibers with the greater portion thereof extending from end to end generally in the same direction.

2. A body of cushioning material comprising kapok fibers with the greater portion thereof extending from end to end generally in the same direction.

3. A cushioning body, or structure, the resilient filling of which comprises kapok fibers the greater portion of which extend from end to end generally in the same direction.

4. A thermal insulating structure comprising a body of separate kapok fibers with the greater portion of the fibers extending from end to end generally in the same direction and substantially normal to the direction of heat transmission therethrough.

HARVEY B. LINDSAY.